(12) United States Patent
Letzsch

(10) Patent No.: US 7,479,218 B2
(45) Date of Patent: Jan. 20, 2009

(54) DEEP CATALYTIC CRACKING PROCESS

(75) Inventor: Warren S. Letzsch, Ellicott City, MD (US)

(73) Assignee: Stone & Webster Process Technology, Inc., Houston, TX (US)

( * ) Notice: Subject to any disclaimer, the term of this patent is extended or adjusted under 35 U.S.C. 154(b) by 675 days.

(21) Appl. No.: 11/085,786

(22) Filed: Mar. 21, 2005

(65) Prior Publication Data

US 2005/0163674 A1 Jul. 28, 2005

Related U.S. Application Data

(60) Continuation of application No. 10/674,865, filed on Sep. 30, 2003, now Pat. No. 6,905,591, which is a division of application No. 10/043,954, filed on Jan. 10, 2002, now abandoned.

(51) Int. Cl.
*C10G 11/00* (2006.01)
(52) U.S. Cl. .................. 208/113; 208/121; 585/899; 585/648; 585/651
(58) Field of Classification Search .............. 208/74, 208/75, 113, 155
See application file for complete search history.

(56) References Cited

U.S. PATENT DOCUMENTS

| | | | |
|---|---|---|---|
| 3,407,789 A | 10/1968 | Hallee et al. | |
| 3,647,682 A | 3/1972 | Rabo et al. | |
| 3,702,886 A | 11/1972 | Argauer et al. | |
| 3,758,403 A | 9/1973 | Rosinski et al. | |
| 3,820,955 A | 6/1974 | Woebcke | |
| 4,404,095 A | 9/1983 | Haddad et al. | |
| 4,433,984 A | 2/1984 | Gartside et al. | |
| 4,499,055 A | 2/1985 | DiNicolantonio et al. | |
| 4,756,886 A | 7/1988 | Pfeiffer et al. | |
| 4,814,067 A | 3/1989 | Gartside et al. | |
| 4,828,679 A | 5/1989 | Cormier, Jr. et al. | |
| 4,891,129 A | 1/1990 | Barnes | |
| 4,892,643 A | 1/1990 | Herbst et al. | |
| 4,980,053 A | 12/1990 | Li et al. | |
| 5,009,769 A | 4/1991 | Goelzer | |
| 5,043,058 A | 8/1991 | Forgac et al. | |
| 5,087,349 A | 2/1992 | Goelzer et al. | |
| 5,196,172 A | 3/1993 | Weinberg et al. | |
| 5,232,675 A | 8/1993 | Shu et al. | |
| 5,259,855 A | 11/1993 | Ross, Jr. et al. | |
| 5,314,610 A | 5/1994 | Gartside | |
| 5,324,484 A | 6/1994 | Gartside et al. | |
| 5,326,465 A | 7/1994 | Yongqing et al. | |
| 5,358,918 A | 10/1994 | Yukang et al. | |
| 5,380,690 A | 1/1995 | Zhicheng et al. | |
| 5,565,176 A | 10/1996 | Johnson et al. | |
| 5,662,868 A | 9/1997 | Letzsch et al. | |
| 5,670,037 A | 9/1997 | Zaiting et al. | |
| 5,723,040 A | 3/1998 | Letzsch et al. | |

(Continued)

FOREIGN PATENT DOCUMENTS

EP 1 046 696 A2 10/2000

*Primary Examiner*—Tam M Nguyen
(74) *Attorney, Agent, or Firm*—Locke Lord Bissell & Liddell LLP; Alan B. Clement

(57) ABSTRACT

The present invention provides a catalytic cracking reactor system and process in which a riser reactor is configured to have two sections of different radii in order to produced improved selectivity to propene and butenes as products.

1 Claim, 1 Drawing Sheet

U.S. PATENT DOCUMENTS 5,766,558 A 6/1998 Letzsch et al.
5,981,818 A 11/1999 Purvis et al.
6,010,618 A 1/2000 Lomas
6,495,028 B1 12/2002 Xu et al.

DEEP CATALYTIC CRACKING PROCESS

This application is a continuation of U.S. patent application Ser. No. 10/674,865, filed Sep. 30, 2003 now U.S. Pat. No. 6,905,591, which is currently pending and is incorporated herein by reference. U.S. patent application Ser. No. 10/674,865 is a divisional of U.S. patent application Ser. No. 10/043,954, filed Jan. 10, 2002, abandoned on Jun. 30, 2004.

FIELD OF THE INVENTION

The present invention relates to a process for converting hydrocarbon feedstocks to cracked products. More particularly, the present invention relates to an improved process for producing olefins from hydrocarbon feedstocks. Most particularly, the present invention relates to an improvement to deep catalytic cracking (DCC) processes.

BACKGROUND OF THE INVENTION

The processes of non-catalytically cracking and catalytically cracking hydrocarbon feedstocks are well known in the art. In this regard, steam cracking in a furnace and contact with hot non-catalytic particulate solids are two well-known examples of non-catalytic cracking process. Examples of non-catalytic cracking processes of these types are disclosed in, for example, Hallee et al., U.S. Pat. No. 3,407,789; Woebcke, U.S. Pat. No. 3,820,955; DiNicolantonio, U.S. Pat. No. 4,499,055 and Gartside et al., U.S. Pat. No. 4,814,067.

Additionally, catalytic cracking processes are known. For example, fluid catalytic cracking processes have been described in the patent literature in Cormier, Jr. et al., U.S. Pat. No. 4,828,679; Rabo et al., U.S. Pat. No. 3,647,682; Rosinski et al., U.S. Pat. No. 3,758,403; Lomas, U.S. Pat. No. 6,010,618; and Gartside et al., U.S. Pat. No. 5,324,484. Special mention is made of the improvements in fluid catalytic cracking described in Letzsch et al., U.S. Pat. No. 5,662,868 and Letzsch et al., U.S. Pat. No. 5,723,040.

Another catalytic cracking process that is especially useful in producing olefins from hydrocarbon feedstocks has been termed the deep catalytic cracking processes. The deep catalytic cracking process is described in Li et al., U.S. Pat. No. 4,980,053; Yongqing et al., U.S. Pat. No. 5,326,465; Shu et al., U.S. Pat. No. 5,232,675; Zhicheng et al., U.S. Pat. No. 5,380,690 and Zaiting et al., U.S. Pat. No. 5,670,037.

The olefins produced in these processes have long been desired as feedstocks for the petrochemical industries. Olefins such as ethylene, propylene, the butenes and the pentenes are useful in preparing a wide variety of end products, including but not limited to polyethylenes, polypropylenes, polyisobutylene and other polymers, alcohols, vinyl chloride monomer, acrylonitrile, methyl tertiary butyl ether and other petrochemicals, and a variety of rubbers such as butyl rubber. Additionally, the heavier hydrocarbons produced in the processes have also been long desired for use as gasolines, fuels and light cycle oils.

It would constitute a significant advancement in the state of the art if an improved deep catalytic cracking process could be developed which could handle a wide variety of feedstocks and crack these feedstocks to more valuable olefins ($C_3$ and $C_4$ olefins) with less $C_2$ olefins. It would represent a further significant advancement in the state of the art if the improved process could be readily and easily applied to revamping an existing catalytic cracking process.

SUMMARY OF THE INVENTION

To this end, the present inventor has now discovered an unique improved deep catalytic cracking process comprising a first cracking reaction operated at relatively high weight hourly space velocity to convert approximately 35 to 60 percent of the feed and a second cracking operation operated at relatively low weight hourly space velocity to complete conversion, that overcomes the drawbacks of the prior art and meets the commercially desirable aspects discussed above.

In view of the foregoing, it is an object of the present invention to provide an improved deep catalytic cracking process.

It is a further object of the present invention to provide an improved deep catalytic cracking process that produces increased yields of $C_3$ and $C_4$ olefins at the expense of $C_2$ olefins.

It is another object of the present invention to provide an improved deep catalytic cracking process that can be employed in an existing cracking facility that can easily be revamped to accommodate the improved process of the present invention.

These and other objects evident to those of ordinary skill in the art are provided by the present invention discussed in detail hereinbelow.

BRIEF DESCRIPTION OF THE DRAWING

The FIGURE depicts a preferred embodiment of the present invention.

DETAILED DESCRIPTION OF THE INVENTION

Figure 1:
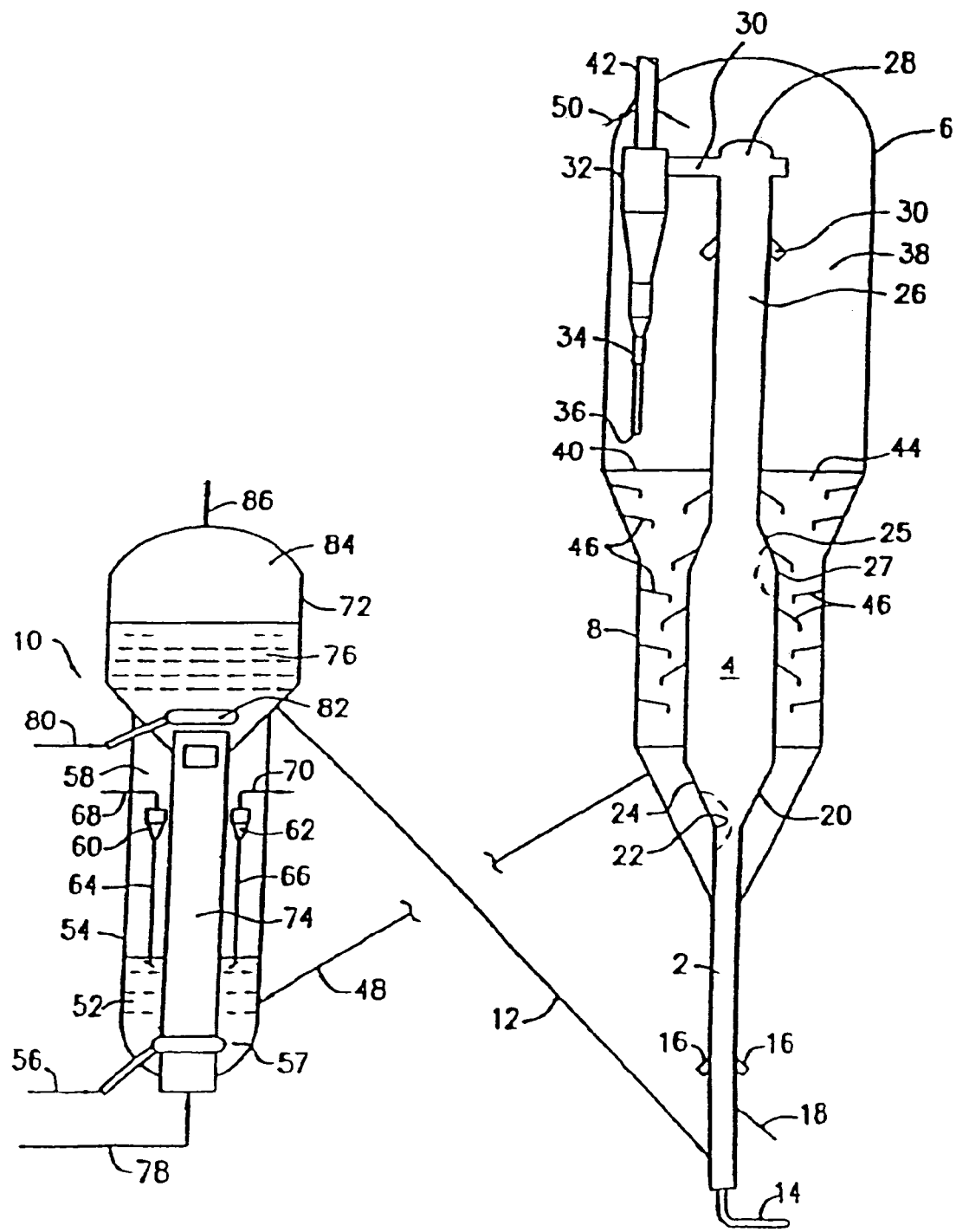

The present invention provides an improved process for deep catalytic cracking of a hydrocarbon feedstock. In a conventional deep catalytic cracking process, a preheated hydrocarbon feedstock is cracked over heated solid acidic catalyst in a reactor at temperatures ranging from about 925° F. to about 1350° F., preferably from about 1025° F. to about 1150° F. The weight hourly space velocity of the feedstock charge may range from about 0.2 $hr^{-1}$ to about 20 $hr^{-1}$. The catalyst-to-oil ratio may vary from about 2 to about 12, preferably from about 5 to about 10. In order to lower the partial pressure of the hydrocarbon feed, steam or other gases, such as the dry gas of a catalytic cracking unit, may be added into the reactor during the conversion process.

When steam is used, a weight ratio of steam to hydrocarbon feed is preferably maintained at from about 0.01 to 0.5:1. The total pressure of the reaction preferably ranges from about 20 psia to about 45 psia, more preferably from about 25 psia to about 35 psia.

After the reaction, the spent catalyst particles may be steam stripped to remove residual hydrocarbons absorbed on or entrained with the catalyst as is known in the art. The spent catalyst particles with coke deposited thereon are then transferred to a regeneration zone as is also well known to those of ordinary skill in the art.

Regeneration of the catalyst is then generally conducted by contacting the catalyst with an oxygen-containing gas at a temperature ranging from about 1175° F. to about 1350° F. Afterwards the regenerated catalyst is recycled to the reaction zone.

Hydrocarbon feedstocks useful in the DCC processes of the prior art, and in accordance with this invention, may vary in a wide range, and typically are relatively heavy hydrocarbon feedstocks, such as those selected from petroleum fractions with different boiling ranges, i.e., naphtha, gas oil, vacuum gas oil, residual oil, crude oil and mixtures thereof.

Catalysts for use in the DCC processes of the prior art and in accordance with the present invention are solid, acidic catalysts comprising one or more active components and a matrix material. The active components include amorphous aluminosilicates or zeolites such as pentasil shape selective molecular sieves, faujasite, ZSM-5 type catalysts, rare earth cation exchanged faujasite, chemically treated and/or stabilized faujasite and mixtures thereof. The matrix material includes synthetic inorganic oxides and mineral clays. All of these catalysts are available commercially.

Exemplary of the useful catalysts are pentasil shape molecular sieves, ZSM-5, rare earth exchanged Y sieve (REY) containing catalysts, pentasil shape molecular sieves supported on kaolinite, amorphous aluminosilicates and mixtures of any of the foregoing. For a more detailed description of the conventional DCC process and the useful catalysts and variations on the DCC process reference is made to Li et al., U.S. Pat. No. 4,980,053; Yongqing et al., U.S. Pat. No. 5,326,465; Shu et al., U.S. Pat. No. 5,232,675; Zhicheng et al., U.S. Pat. No. 5,380,690; Yukang et al., U.S. Pat. No. 5,358,918 and Zaiting et al., U.S. Pat. No. 5,670,037. Reference is also made to Argauer et al., U.S. Pat. No. 3,702,886 for a description of ZSM-5.

As mentioned above, the present invention provides an improved process over the DCC processes of the prior art, by providing for the cracking in two separate and distinct cracking zones, the first operating at a relatively high weight hourly space velocity, and the second operating at a relatively low weight hour space velocity. The FIGURE shows a schematic arrangement of a riser and regenerator system useful in the practice of the present invention. The arrangement of the FIGURE comprises a first riser section 2, where the feedstock is selectively catalytically cracked to form gasoline, a second riser section 4 where the gasoline produced in the first riser selection is selectively catalytically cracked to olefins, a disengager vessel 6, a stripper 8 and a regenerator 10 that provides for a conversion zone and for the pneumatic conveyance of catalyst. The arrangement circulates the catalyst and contacts the feed in the manner described herein below. Because the second riser section 4 is wider in radius relative to the first riser section 2, these sections are at times referenced herein as the narrow and broader sections, respectively.

Regenerated catalyst from catalyst regenerator 10 passes downwardly from the regenerator 10 through a line 12 to the bottom portion of the first narrow riser section 2. Appropriate control valve means (not shown) can control the flow of catalyst into and through the line 12. A lift fluid (optional) enters the bottom of the first narrow riser section 2 through a line 14 and transports the regenerated catalyst up through the riser 2 into contact with a feedstream. Feed injection nozzles 16 inject the feedstream into the flowing regenerated catalyst and the mixture of feed and catalyst continue upwardly through the riser.

The first narrow riser section 2 will have a length and radius sufficient to provide a weight hourly space velocity in the first narrow riser section 2 ranging from about 50 to about 200 $hr^{-1}$ or more, preferably in the range of from about 70 to about 80 $hr^{-1}$. In this first narrow riser section 2, the conversion of the feed is from about 35 to about 60%, and the cracking conditions are set so that the conversion is selective to the creation of gasoline from the feedstock. For example, the temperature in the first narrow riser section 2 preferably ranges from about 925° F. to about 1350° F., preferably from about 1000° F. to about 1150° F. In order to lower the partial pressure of the hydrocarbon feed, steam or other gases, such as the dry gas of a catalytic cracking unit, in amounts up to about 20 weight percent based on the weight of the feedstock, may be added into the first narrow riser section 2 via a conduit 18, which can be located either upstream or downstream of the feed injectors.

The first narrow riser section 2 then proceeds through a diameter transition zone 20 and into the second broader riser section 4. The ratio of the radius of the second broader riser section 4 to the radius of the first narrow riser section 2 should range from about 1.1:1 to about 5.0:1, preferably from about 1.25:1 to about 2.5:1, or from about 1.5:1 to about 2.5:1. Typically, the radius of the first narrow riser section 2 can range from about six inches (6") to about eight feet (8'), preferably from about two feet (2') to about six feet (6'), and the radius of the second wider riser section 4 can range from about nine inches (9") to about sixteen feet (16'), preferably from about three feet (3') to about ten feet (10'). However, the actual radius size will generally be dependent upon the amount of hydrocarbon feedstock which is being cracked in the reactor. Also preferred is where the diameter transition zone 20 effects a relatively smooth diameter transition, such as at an interior angle 22 ranging from about 5° to about 30°, preferably from about 8° to about 200°.

In the second broader riser section 4, the weight hourly space velocity is significantly slowed, such as to a weight hourly space velocity of less than about 100 $hr^{-1}$, such as from about 90 $hr^{-1}$ to about 2 $hr^{-1}$, more preferably from about 50 $hr^{-1}$ to about 8.0 $h^{-1}$. The temperature in the second broader riser section 4 will preferably range from about 900° F. to about 1250° F., preferably from about 975° F. to about 1050° F. At these conditions, the conversion of the feedstock is completed, and the gasoline produced in the first narrow riser section 2 is selectively converted at high yields to LPG, i.e., $C_3$ and $C_4$ olefins with significantly less production of ethylene than in prior art deep catalytic conversion or fluid catalytic conversion processes. In preferred embodiments, dilution steam or other gases for lowering the partial pressure of the hydrocarbons may be added in amounts up to about 20 weight percent based on the weight of the feedstock to the second broader riser section 4 via a line 24.

The lengths of the first narrow riser section 2 and the second broader riser section 4 are set in order to effect the requisite conversions in accordance with the operating conditions in the riser sections, the type of feedstock and the type of catalyst employed, as will be apparent to those skilled in the art. As a non-limiting example, the first narrow riser section 2 can have a length of about 40 feet and a the second broader riser section 4 can have a length of about 25 feet where the ratio of the radius in the second broader riser section 4 to the first narrow riser section 2 is about 1.5:1.

After completion of the conversion in the second broader riser section 4, the riser narrows to termination section 26 that directs the cracked gases into a crossover duct 28 or other riser termination devices as are well known to those skilled in the art. The radius of the termination section 26 is not critical to the present invention; however, preferably the radius of the termination section 26 is approximately the same as that of the first narrow riser section 2. The radius of the termination section 26 should be sufficient to accommodate the increased volume of lighter components and is suitable for attaching to the crossover duct 28. Again, as with the first diameter transition zone 22, a second transition zone 25 is preferred between the second broader riser section 4 and termination section 26 which effects a relatively smooth diameter transition, such as at an angle 27 ranging from about 5° to about 30°, preferably from about 8° to about 200.

At the riser top, near the crossover duct 28, the cracked vapors are discharged into gas recovery conduits 30 that direct the cracked gas vapors mixed with spent catalyst into cyclones 32. Spent catalyst is separated from the cracked gas vapors in the cyclones 32 and the spent catalyst falls out of cyclone 32 through dipleg 34 at a rate regulated by a dipleg sealing means, such as a flapper valve, 36. Secondary cyclones (not shown) may also be included in the disengaging vessel 6 to separate catalyst fines from the cracked vapors as is well known in the art.

The cracked gases are then removed from the cyclone 32 (and then preferably further separated from catalyst fines in secondary cyclones) and out of the disengaging vessel 6 via a conduit 42 for further processing and recovery of the high yields of propene and butenes produced in accordance with the present invention, along with other product hydrocarbons. In preferred embodiments, where desired, quench, injected via quench injection nozzles 50, may be added to the cracked gases in conduit 42 for quenching residual cracking reactions. The quench injection nozzles 50 add a quench fluid for quenching the cracking reactions, both thermal and catalytic, which may be continuing. Suitable quench fluids can comprise kerosene, light coker gas oil, coke still (coker) distillates (CSD), hydrotreated distillate, light catalytic cycle oil (LCCO or LCO), heavy catalytic cycle oil (HCCO or HCO), heavy catalytic naphtha (HCN), fresh unprocessed virgin feedstocks such as virgin gas oil, heavy virgin naphtha, light virgin naphtha, water, steam and mixtures or a combinations of any of the foregoing. Desirably, the quench should have low thermal reactivity. Previously cracked hydrocarbons are generally desirable because they are less reactive to thermal quenching than fresh unprocessed virgin feedstocks and hydrotreated feedstocks. Quenching is more fully described in the published art, for example, in Forgac et al., U.S. Pat. No. 5,043,058.

Disengaging vessel 6 serves as a containment vessel that houses the upper portion of the riser reactor, the catalyst/cracked product vapor separation equipment and the stripper 8. The catalyst is discharged into a lower portion of the dilute phase 38 of the disengaging vessel 6 at a point above the surface 40 of the dense phase catalyst bed 44. Disengaging vessel 6 also confines gases passing across the surface of dense phase catalyst bed 44. Gases in the upper dilute phase 38 are recovered in cyclone separators (not shown) and any separated catalyst particles or fines are returned to the dense phase catalyst bed 44.

The catalyst in dense bed 44 may then conveniently be stripped in the stripper section 8 of the disengager vessel 6 by injection of steam or other stripping fluid (not shown). In preferred arrangements, baffles 46 are provided in the stripping section 8 to aid in displacing any product gases from the catalysts as the catalyst proceeds downwardly through the stripping section 8. Alternatively, packing can also be used in the stripping stage as is known to those skilled in the art.

The stripped catalyst is then removed from the bottom of the disengaging vessel 6 via a line 48 for transport to the catalyst regenerator 10. Any of a number of regenerator designs well known to those skilled in the art may be employed in connection with the present invention. An exemplary two-stage regenerator design, as shown in the FIGURE, is described below, although, as indicated above, any type of regenerator may be used in accordance with the present invention, including those with and without catalyst coolers.

The catalyst from line 48 is directed into a dense fluidized catalyst bed 52 in the lower stage (regeneration zone) 54 of a two-stage regenerator vessel 10. In the dense fluidized catalyst bed 52, catalyst is contacted with an oxygen-containing regeneration gas introduced into the lower regeneration zone 54 via a line 56 and distribution ring 57. Lower regeneration zone 54, as operated in accordance with procedures known in the art, is maintained under conditions as a relatively low temperature regeneration operation generally below 1300° F. Conditions in the lower regeneration zone 54 are selected to achieve at least partial combustion and removal of carbon deposits and substantially all of the hydrogen associated with the deposited hydrocarbonaceous material from catalytic cracking.

The combustion accomplished in the lower regeneration zone 54 is thus accomplished under conditions to form a carbon monoxide rich first regeneration zone flue gas in an upper dilute phase 58 of the lower regeneration zone 54. The flue gas is separated from entrained catalyst fines by one or more separators, such as cyclones 60 and 62. Catalyst thus separated from the carbon monoxide gases by the cyclones 60 and 62 is returned to the catalyst bed 52 via diplegs 64 and 66, respectively. Carbon monoxide rich flue gases recovered from the cyclones 60 and 62 is directed via conduit means 68 and 70, respectively, to a carbon monoxide boiler or incinerator and/or a flue gas cooler (both not shown) to generate steam by a more complete combustion of available carbon monoxide therein, prior to combination with other process flue gas streams for venting or other processing.

In the first lower regeneration zone 54, it is therefore intended that the regeneration conditions are selected such that the catalyst is only partly regenerated by the removal of hydrocarbonaceous deposits therefrom, i.e., removal of from about 40 to about 80% of the coke deposited thereon. Sufficient residual carbon is intended to remain on the catalyst to achieve higher catalyst particle temperatures in a second catalyst regeneration zone 72, i.e., above about 1300° F., as required to achieve virtually complete removal of the carbon from the catalyst particles by combustion thereof with excess oxygen-containing regeneration gas.

Accordingly, the partially regenerated catalyst from the first regeneration zone bed 52, now substantially free of hydrogen and having limited residual carbon deposits thereon, is withdrawn from a lower portion of bed 52 for transfer upwardly through riser conduit 74 to discharge into the lower portion of a dense fluid bed of catalyst 76 in upper regeneration zone 72. Lift gas, such as compressed air, is charged into the bottom of riser conduit 74 via a line 78.

Conditions in the upper regeneration zone 72 are designed to accomplish substantially complete removal of carbon from the catalyst not removed in the lower regeneration zone 54, as discussed above. Accordingly, regeneration gas such as air or oxygen-enriched gas is charged to bed 76 by conduit means 80 and distributor ring 82.

Cyclones (not shown) may be present in the upper dilute phase 84 of the upper regeneration zone 72 or they may be located external thereto depending on the temperature in the upper zone and constrains of the materials of construction for the cyclones. In either event, the upper regeneration cyclones operate similar of those of the lower zone (cyclones 60 and 62) and separate the flue gas from the catalyst particles, withdrawing the flue gas via a line 86 and returning the separated catalyst particles to the bed 76. The fully regenerated catalyst at the bottom of bed 82 is then removed from the upper stage 72 of the regenerator vessel 10 via a standpipe 12 and directed to the lower portion of the riser reactor 2.

In the revamping mode, one skilled in the art can see in light of the above-description, that a typical fluid catalytic cracking system, or other cracking reacting system employing a riser-type reactor, can readily be converted into the improved deep catalytic cracking system of the present invention. A portion of the existing riser in the FCC facility can be cut and removed, and replaced by welding with a section of the broader reaction zone and transition zones. In this manner, conversion of FCC plants directed to increased gasoline production, can be revamped into an improved DCC plant that produces high yields of propene and butenes.

Many variations of the present invention will suggest themselves to those skilled in the art in light of the above-detailed description. For example, the quench injection may be added at the two points suggested in the FIG., may not be added at all, or may be added at any point downstream. Further, the cyclone separator may or may not be close coupled to the riser terminator. Other types of gross cut separators may be employed in addition to the cyclones, such as a ramshorn separator, an inverted can separator, or a globe separator. See, for example, the separators shown in Pfeiffer et al., U.S. Pat. No. 4,756,886, Haddad et al., U.S. Pat. No. 4,404,095; Ross et al., U.S. Pat. No. 5,259,855, Barnes, U.S. Pat. No. 4,891,129 and/or Gartside et al., U.S. Pat. No. 4,433,984. Other regenerator configurations may be employed. Additionally, the radius and lengths of the two riser sections may be varied in order to achieve the desired results depending on catalyst type and feedstock, as described hereinabove. All such obvious modifications are within the full-intended scope of the appended claims.

All of the above-referenced patents are hereby incorporated by reference.

I claim:

1. A method for converting a fluid catalytic cracking system to an improved deep catalytic cracking system comprising the steps of:
   (a) removing a middle section of an existing riser reactor in the fluid catalytic cracking system to produce a lower first narrower catalytic cracking riser reactor section that catalytically cracks a hydrocarbonaceous feedstock in the first carcking zone to produce an intermediate cracked product rich in gasoline, and that has a radius x, a means for feeding said hydrocarbon feedstock, a means for feeding cracking catalyst located in a lower portion thereof, and an upper riser product conduit having connection to a cracked product/spent catalyst separation means; and
   (b) replacing said removed middle riser reactor section with a second wider riser catalytic cracking reactor section that cracks said intermediate cracked product in a second cracking zone to produce high yields of $C_3$ and $C_4$ olefins, that has a radius y, wherein the ratio of y:x ranges from about 1.1:1 to about 5.0:1, and that operatively connects the bottom of said second wider catalytic cracking reactor section to the top of said first narrower catalytic cracking riser reactor section by a transition reactor section, and the top of said second wider catalytic cracking reactor section to the bottom of said upper riser product conduit.

* * * * *